US011182673B2

(12) United States Patent
Burr et al.

(10) Patent No.: US 11,182,673 B2
(45) Date of Patent: Nov. 23, 2021

(54) TEMPORAL MEMORY ADAPTED FOR SINGLE-SHOT LEARNING AND DISAMBIGUATION OF MULTIPLE PREDICTIONS

(71) Applicant: INTERNATIONAL BUSINESS MACHINES CORPORATION, Armonk, NY (US)

(72) Inventors: Geoffrey W. Burr, San Jose, CA (US); Pritish Narayanan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1025 days.

(21) Appl. No.: 15/273,141

(22) Filed: Sep. 22, 2016

(65) Prior Publication Data

US 2018/0082180 A1 Mar. 22, 2018

(51) Int. Cl.
*G06N 3/08* (2006.01)
*G06N 3/04* (2006.01)

(52) U.S. Cl.
CPC ............. *G06N 3/082* (2013.01); *G06N 3/049* (2013.01); *G06N 3/0454* (2013.01)

(58) Field of Classification Search
CPC ..................................................... G06N 3/082
USPC .......................................................... 706/21
See application file for complete search history.

(56) References Cited

U.S. PATENT DOCUMENTS

| 6,092,018 A * | 7/2000 | Puskorius | F02D 31/005 |
| | | | 123/339.11 |
| 8,041,653 B2 * | 10/2011 | Nugent | G06N 3/063 |
| | | | 706/12 |
| 8,732,098 B2 | 5/2014 | Ahmad et al. | |
| 9,189,745 B2 | 11/2015 | Hawkins et al. | |

(Continued)

OTHER PUBLICATIONS

A. Kneller and J. Thornton, "Distal dendrite feedback in hierarchical temporal memory," 2015 International Joint Conference on Neural Networks (IJCNN), Killarney, 2015, pp. 1-8. (Year: 2015).*

(Continued)

*Primary Examiner* — James D. Rutten
(74) *Attorney, Agent, or Firm* — Erik Huestis; Stephen Kenny; Foley Hoag LLP

(57) ABSTRACT

Single-shot learning and disambiguation of multiple predictions in hierarchical temporal memory is provided. In various embodiments an input sequence is read. The sequence comprises first, second, and third time-ordered components. Each of the time-ordered components is encoded in a sparse distributed representation. The sparse distributed representation of the first time-ordered component is inputted into a first portion of a hierarchical temporal memory. The sparse distributed representation of the second time-ordered component is inputted into a second portion of the hierarchical temporal memory. The second portion is connected to the first portion by a first plurality of synapses. A plurality of predictions as to the third time-ordered component is generated within a third portion of the hierarchical temporal memory. The third portion is connected to the second portion by a second plurality of synapses. Based on the plurality of predictions, additional synaptic connections are added between the first portion and the second portion.

24 Claims, 15 Drawing Sheets

(56) References Cited

U.S. PATENT DOCUMENTS

| | | | |
|---|---|---|---|
| 2008/0167820 | A1 | 7/2008 | Oguchi et al. |
| 2008/0208915 | A1* | 8/2008 | George .................. G06N 20/00 |
| 2011/0225108 | A1* | 9/2011 | Hawkins ................ G06N 3/049 |
| | | | 706/12 |
| 2013/0054496 | A1 | 2/2013 | Marianetti, II et al. |
| 2017/0255861 | A1* | 9/2017 | Hawkins .............. G06N 3/0454 |
| 2018/0082180 | A1* | 3/2018 | Burr ...................... G06N 3/0454 |

OTHER PUBLICATIONS

Y. Cui, C. Surpur, S. Ahmad and J. Hawkins, "A comparative study of HTM and other neural network models for online sequence learning with streaming data," 2016 International Joint Conference on Neural Networks (IJCNN), Vancouver, BC, 2016, pp. 1530-1538 (Year: 2016).*

Cui et al., "Continuous online sequence learning with an unsupervised neural network model", 2016, retrieved Aug. 18, 2021 at <arxiv.org/abs/1512.05463>, arXiv: 1512.05463 (Year: 2016).*
International Search Report and Written Opinion for International Application No. PCT/IB2017/055732 dated Jan. 25, 2018.
Byrne, "Encoding Reality: Prediction-Assisted Cortical Learning Algorithm in Hierarchial Temporal Memory," pp. 1-28 (2015).
McCall et al., "Cortical Learning Algorithms with Predictive Coding for a Systems0Level Cognitive Architecture," Second Annual Conference on Advances in Cognitive Systems, pp. 149-166 (2013).
Guliashvili, G. et al., "Predicting Movement of Multiple Distinguishable Targets using Sparsely Distributed Sensors," Apr. 1, 2016.
Yamada, M.et al., "Method and System for Life Cycle Modeling for Temporal Pattern Discover," Dec. 5, 2014.
"Methods and Systems for Processing Collected Data," Aug. 27, 2012.

* cited by examiner

TEMPORAL MEMORY ADAPTED FOR SINGLE-SHOT LEARNING AND DISAMBIGUATION OF MULTIPLE PREDICTIONS

BACKGROUND

Embodiments of the present invention relate to hierarchical temporal memory systems, and more specifically, to using sparse distributed representations to learn and process temporal sequences in hierarchical temporal memory systems.

BRIEF SUMMARY

According to embodiments of the present disclosure, methods of, and computer program products for, operating a temporal memory are provided. An input sequence is read. The sequence comprises first, second, and third time-ordered components. Each of the first, second, and third time-ordered components is encoded in a sparse distributed representation. The sparse distributed representation of the first time-ordered component is inputted into a first portion of a hierarchical temporal memory. The sparse distributed representation of the second time-ordered component is inputted into a second portion of the hierarchical temporal memory. The second portion is connected to the first portion by a first plurality of synapses. A plurality of predictions as to the third time-ordered component is generated within a third portion of the hierarchical temporal memory. The third portion is connected to the second portion by a second plurality of synapses. Based on the plurality of predictions, additional synaptic connections are added between the first portion and the second portion.

According to other embodiments of the present disclosure, a system comprising temporal memory is provided. The temporal memory comprises first, second, and third portions. Each portion comprises a plurality of columns. Each column comprises a plurality of cells. The second portion is connected to the first portion by a first plurality of synapses. The third portion is connected to the second portion by a first plurality of synapses. A plurality of cells is active in the first portion, encoding a sparse distributed representation of a first time-ordered component. A plurality of cells is active in the second portion, encoding a sparse distributed representation of a plurality of instances of the second time-ordered component. The temporal memory is adapted to generate a plurality of predictions as to a third time-ordered component within the third portion, and based on the plurality of predictions, add additional synaptic connections between the first portion and the second portion.

According to other embodiments of the of the present disclosure, methods of, and computer program products for, operating a temporal memory are provided. A first time-ordered component of an input sequence is read. The first time-ordered component is encoded in a sparse distributed representation. The sparse distributed representation of the first time-ordered component is input into a region of a hierarchical temporal memory. The region is interconnected by a plurality of synapses. A second time-ordered component of the input sequence is read. The second time-ordered component is encoded in a sparse distributed representation. The sparse distributed representation of the second time-ordered component is input into the region of the hierarchical temporal memory. A plurality of predictions is generated as to a third time-ordered component of the input sequence within the region of the hierarchical temporal memory. Based on the plurality of predictions, additional synaptic connections are added in the region.

DETAILED DESCRIPTION

Figure 1:
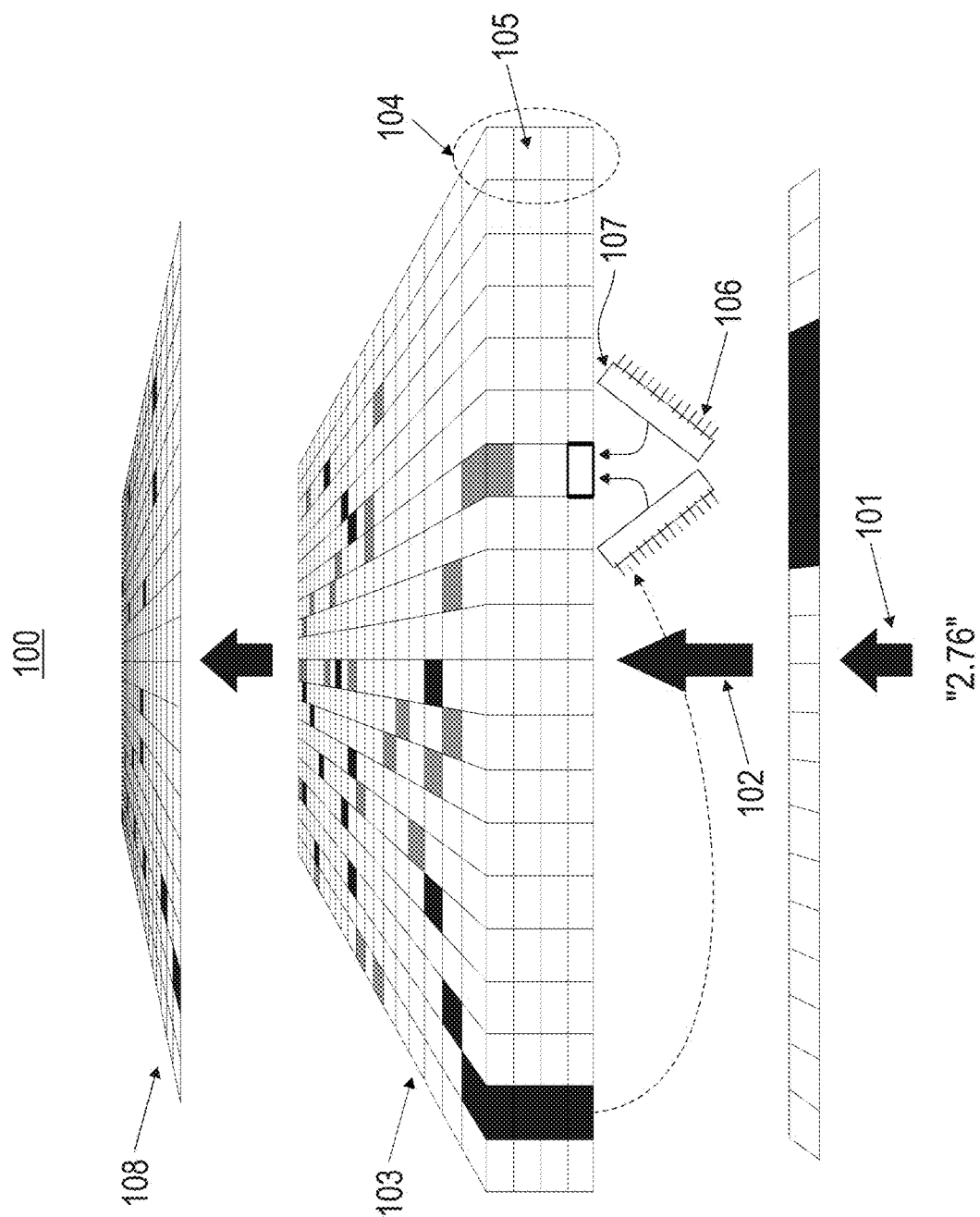
FIG. 1 depicts an exemplary hierarchical temporal memory node according to embodiments of the present disclosure.

Hierarchical Temporal Memory (HTM) systems represent a new approach to machine intelligence. In an HTM system, training data comprising temporal sequences and/or spatial patterns are presented to a network of nodes. The HTM network then builds a model of the statistical structure inherent to the spatial patterns and temporal sequences in the training data, and thereby learns the underlying causes of the temporal sequences of patterns and sequences in the training data. The hierarchical structures of the HTM system allow them to build models of very high dimensional input spaces using reasonable amounts of memory and processing capacity.

The training process of an HTM system generally comprises a form of unsupervised machine learning. During a training process, one or more processing nodes of the HTM system form relationships between temporal sequences and/or spatial patterns present in training input and their associated causes or events. During the learning process, indexes indicative of the cause or events corresponding to the training input may be presented to the HTM system to allow the HTM system to associate particular categories, causes or events with the training input.

Once an HTM system has built a model of a particular input space, it can perform inference or prediction. To perform inference or prediction, novel input including temporal sequences or spatial patterns are presented to the HTM system. During the inference stage, each node in the HTM system produces an output that is more invariant and temporally stable than its input. That is, the output from a node in the HTM system is more abstract and invariant compared to its input. At its highest node, the HTM system will generate an output indicative of the underlying cause or event associated with the novel input.

Some HTM systems include both a spatial pooler and a sequence memory. The spatial pooler converts sequences of input data into sequences of sparse distributed representations (SDRs), or a long binary vector in which most of the bits are 0 and only a few are 1. This SDR is then used to activate the "columns" of a sequence memory.

Some HTM systems further include a processing node for learning and storing temporal sequences of spatial patterns in an input signal. The processing node may learn and store relationships between spatial patterns or temporal sequences of spatial patterns. The learning and storing of relationships or temporal sequences are performed autonomously in a manner that is robust against noise in the input signal. Based on the stored relationships, the processing node may process a subsequent input signal and generate an output that may represent prediction, identity of sequences of spatial patterns or other useful information.

The processing node includes a sequence processor receiving and processing the signal from the spatial pooler to learn, recognize and predict temporal sequences in the input signal. The sequence processor includes one or more columns, each column including one or more cells. A subset of columns may be selected by the spatial pooler signal, causing one or more cells in these columns to activate. When a cell activates, activation states of some other cells in the same node and/or level are detected and stored. By collectively storing the cell activation states in different cells, the sequence processor may store temporal sequences in the input signal.

Each cell includes one or more temporal memory segments. Different temporal memory segments in the cell store different cell activation states at different times, or points within a learned sequence. The sequence processor may activate a cell when the activation states of other cells correspond to cell activation states stored in a temporal memory segment of the cell.

There are a number of drawbacks to the sequence memory approach described above. Every time a cell fails to be predicted (is surprised), synaptic weights (sometimes described as permanences) are decreased, all of the cells within the column are activated (thus potentially leading to numerous subsequent surprised cells in the next timestep), and one cell is randomly chosen as a learning cell which is connected to cells activated in the next timestep. If this random choice turns out to be inappropriate, repeated learning over a number of exposures to the same sequence can eventually correct such a problem. This has the advantage of favoring the learning of repeating features and suppresses any noise in the sequence. However, the associated increasing and decreasing of permanence values while this learning occurs destroys any correlation between permanence strength and the number of times a sequence has been observed, and also steadily degrades the stored memory of previously learned sequences. In addition, when two different sequences that share a section have been learned and the system reaches this branch point and must supply a prediction, the system is incapable of differentiating between the predicted columns that correspond to the first learned sequence and the second learned sequence. Instead, the union of all such columns is predicted, without any information even as to how many unique SDRs might be participating in this union, nor how many times each SDR has been previously observed in this context (coming next after the just-observed partial sequence).

Thus, the present disclosure provides for improved temporal memory that can learn to recognize temporal sequences after a single learning cycle. Upon later exposure to a learned sequence, embodiments of the present disclosure correctly disambiguate in the case of multiple predictions. In particular, each relevant predicted SDR is provided together with the number of times that SDR has been previously observed as the next step in the temporal sequence.

In particular, the present disclosure provides an improved processing node for a temporal memory system. An improved sequence processor, receiving a sequence of sparse distributed representations from some stage lower in the hierarchical system, learns to recognize temporal sequences after a single learning cycle. Upon later exposure to a learned sequence, systems according to the present disclosure can correctly disambiguate in the case of multiple predictions, providing each relevant predicted sparse distributed representation distinctly together with the number of times that sparse distributed representation has been previously observed as the next step in the temporal sequence.

In various embodiments, temporal memory is provided in which synaptic permanences are never decreased, multiple cells are never activated within a column, and the activated cell (representing current bottom-up input to the overall system) in a current sparse distributed representation depends on predicted activations in a future (or next) SDR. Inclusion in the set of potentially active cells can either be restrictive, in which at least one segment must contain a threshold number of connections back to activated cells in the past (or previous) SDR, or permissive, in which at least one segment must contain a threshold number of connections back to any cell in an active column in the previous SDR.

In some embodiments, the assessment of which cell within the current cell-SDR to activate is based on predictions into the future column-SDR and is also identified by a stored iteration number. If the next SDR is not predicted by any cell within a column, a new instance is generated with a random pattern of cell activations and is assigned the next unused instance number. An unused instance number is identified with respect to the current context—the particular current column-SDR followed by that particular future column-SDR.

In some embodiments, once the current cell SDR is identified using future SDR information, then connections from that current SDR back to a past (or previous) SDR are forged, by linking multiple synaptic connections into a single segment which contains connections selected from across the previous SDR. This selection process is mostly random, but is designed to suppress connections from one column to itself, to ensure that all columns of the previous SDR are represented in at least one segment at the current cell-SDR, and to favor connections to columns that are activated infrequently across recently observed sequences. In addition, the relevant instance number is stored with the segment. If no new connections are necessary, then the correctly predicting synaptic weights are incremented, thus tabulating the number of times this particular last-to-current transition has been observed in this unique context.

For prediction, all columns in the next SDRs predicted by any cell in the current SDR are predicted. Unique SDRs are identified by the instance number recorded with the predicting cell segment.

With reference now to FIG. 1, an exemplary hierarchical temporal memory node 100 is depicted. Memory 103 includes columns 104, each containing cells 105. Each cell is laterally connected by a plurality of synapses 106 aggregated through segments 107. Each HTM region consists of a number of highly interconnected columns. In some embodiments, cortical columns tend to inhibit neighboring columns, thus creating a sparse activation of columns. A cortical column is understood as a group of cells that have the same receptive field. Each column has a number of cells that are able to remember several previous states. A cell can be in one of three states: active, inactive and predictive.

When a cell becomes active, it gradually forms connections to nearby cells that tend to be active during several previous time steps. Thus, a cell learns to recognize a known sequence by checking whether the connected cells are active. If a large number of connected cells are active, this cell switches to the predictive state in anticipation of one of the few next inputs of the sequence. The output of a region includes columns in both active and predictive states. Thus, columns are active over longer periods of time, which leads to greater temporal stability seen by the parent region.

Cortical learning algorithms are able to learn continuously from each new input pattern. During inference, HTM tries to match a stream of inputs to fragments of previously learned sequences. This allows each HTM region to be constantly predicting the likely continuation of the recognized sequences. The index of the predicted sequence is the output of the region. Since predictions tend to change less frequently than the input patterns, this leads to increasing temporal stability of the output in higher hierarchy levels. Prediction also helps to fill in missing patterns in the sequence and to interpret ambiguous data by biasing the system to infer what it predicted.

During training, a node 100 receives a temporal sequence of spatial patterns as its input. Input data 101 are encoded into input neurons. A spatial pooler maps each input excitation to an appropriate SDR of constant sparsity 102 in memory 103. A temporal pooler generates invariant representations (SDR) 108 of each recognized sequence. Once trained, the temporal memory can predict the next SDR in the sequence given the current SDR. Each cell can be predicted by lateral synaptic excitation from other cells, aggregated through segments.

In various embodiments described below, the temporal memory SDRs are considered to include one column vector for each of 3 successive time steps; was, is, and will-be.

Figure 2:
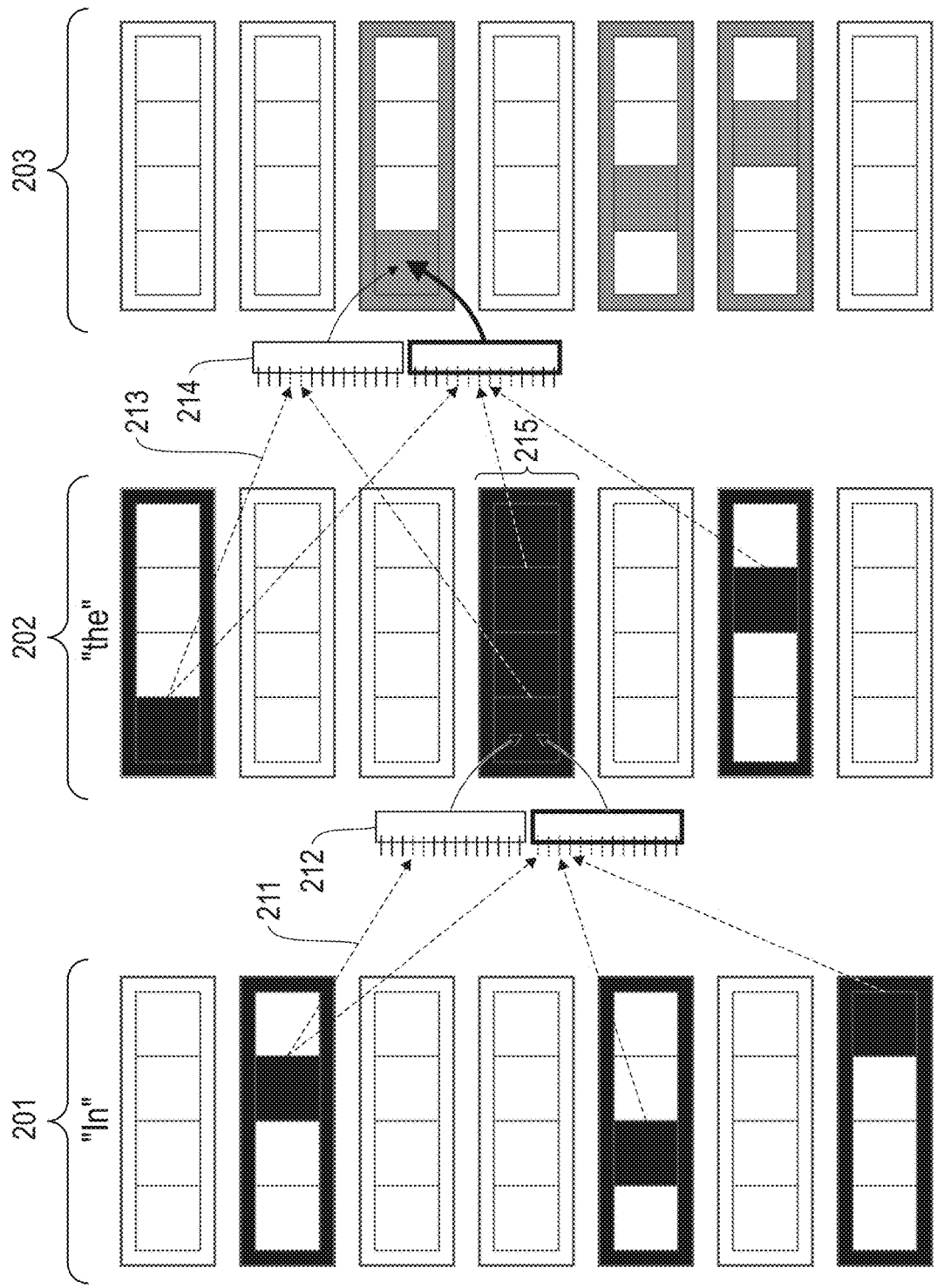
FIG. 2 depicts exemplary columns within a temporal memory according to embodiments of the present disclosure.

Referring now to FIG. 2, exemplary column SDRs within a temporal memory are depicted (each column extending horizontally instead of vertically for ease of illustration). Column SDRs 201, 202, 203 correspond to was, is, and will-be, respectively. Cells within column SDR 201 are connected to cells in column SDR 202 by synapses 211. Synapses are aggregated by segments 212, and a threshold number of incoming synaptic activations is required to activate each segment. Cells in column SDR 202 are in turn connected to cells in column SDR 203 by synapses 213 through segments 214. In conventional training, when a column is surprised, all of its cells are activated. Synapses that predict correctly get their permanence increased. Incorrect predictions or failing to assist in prediction have permanence decreased. In this case, an exemplary phrase "In the . . . " corresponds to the was and is column SDRs 201, 202. In this example, all cells in column 215 are activated, indicating that the column was surprised. This burst on surprise compromises the ability of a network to learn a pattern on a single exposure, because the excess activations lead to formation of connections that must later be unlearned, damaging the network as a whole.

Figure 3:
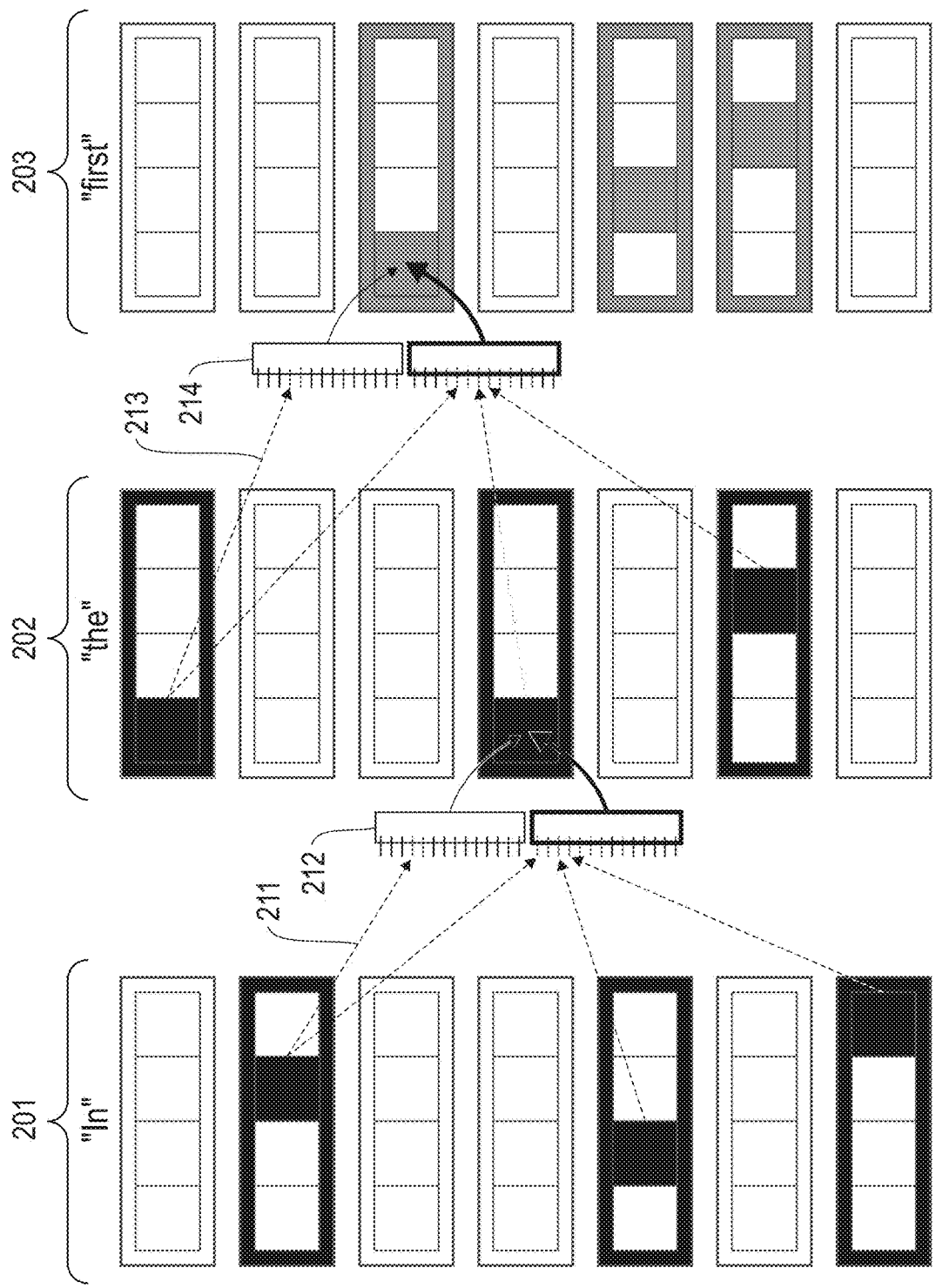
FIGS. 3-5 depict the processing of exemplary phrases across columns within a temporal memory according to embodiments of the present disclosure.
Figure 4:
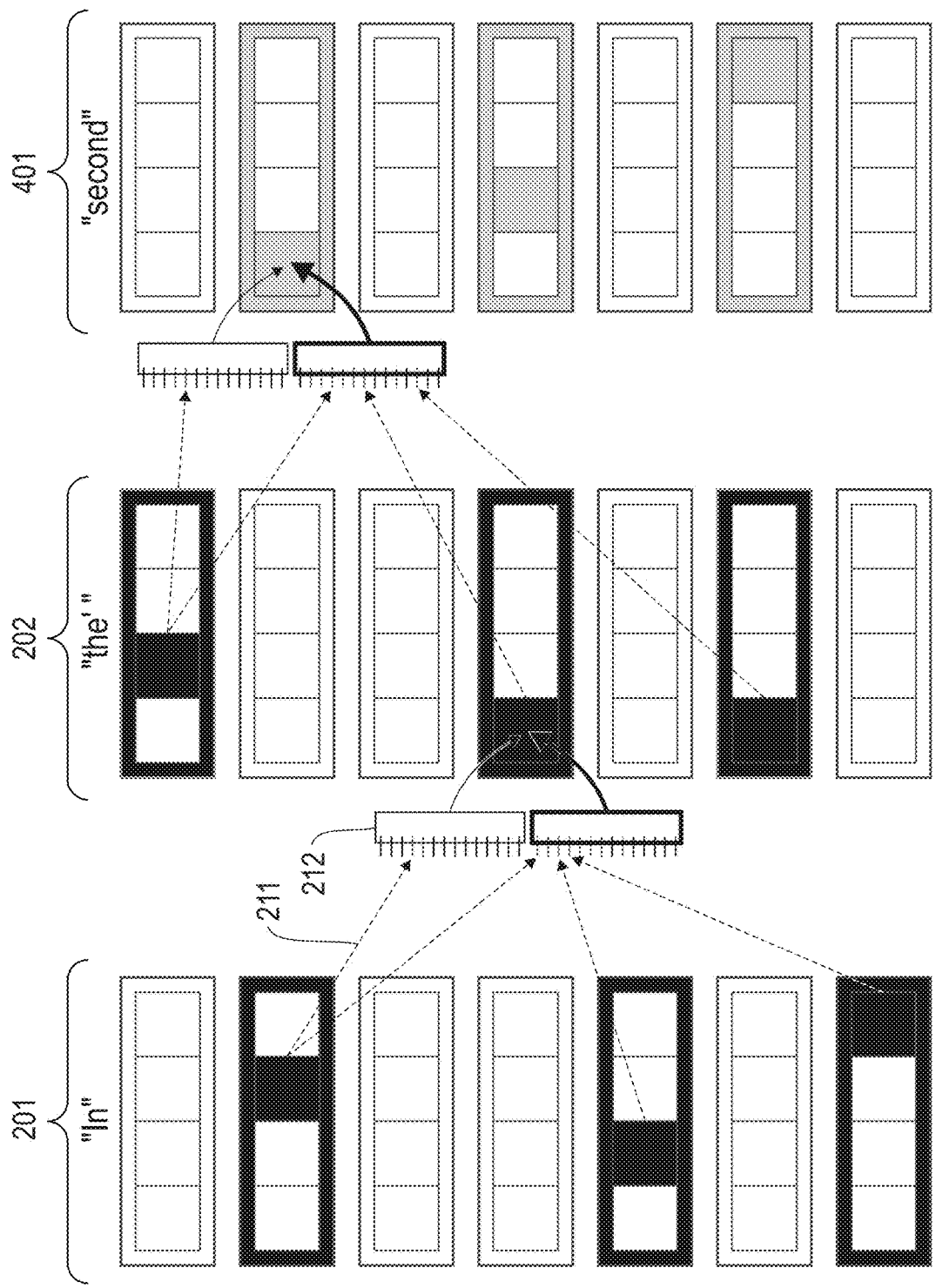

Referring to FIGS. 3-4, two exemplary phrases, "in the first" and "in the second" are illustrated for comparison. Each phrase is distributed across column SDRs 201, 202, 203/401 corresponding to sequential time steps. As shown, in both permutations, "the" has the same column SDR 202. However, the permutations have two distinct cell SDRs, as illustrated by the different pattern of cell activations. The predictions end up being the union of all SDRs seen when at this point before.

Figure 5:
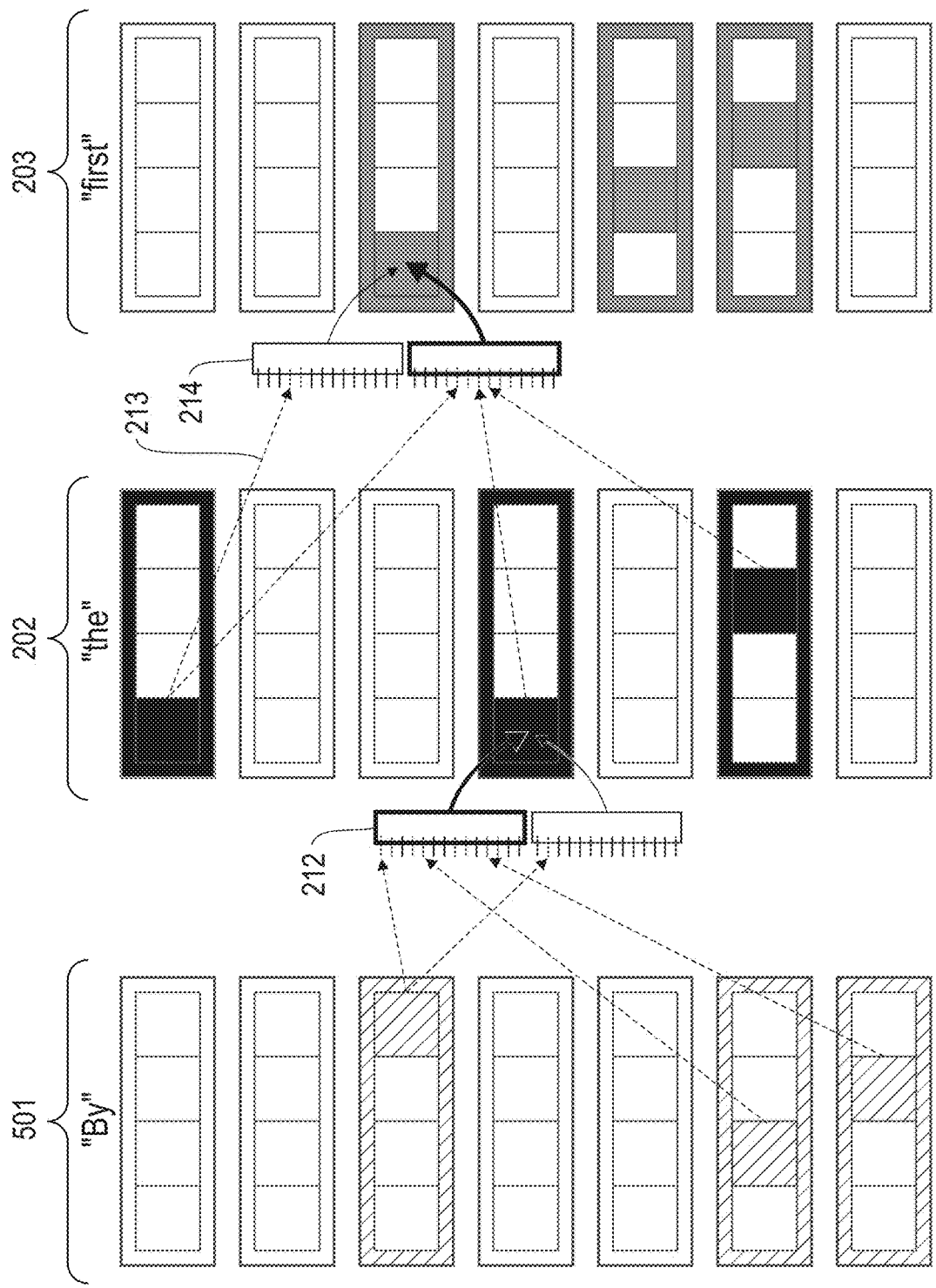

Referring to FIGS. 3 and 5, two exemplary phrases, "in the first" and "by the first" are illustrated for comparison. Each phrase is distributed across column SDRs 201/501, 202, 203 corresponding to sequential time steps. As shown, in both permutations, "the" has the same column SDR 202. However, the permutations are activated by different segments as illustrated by the distinct column SRDs 201, 501. It will be apparent that the same SDR (e.g., 202) can thus be differentiated by both outgoing and incoming context.

Figure 6:
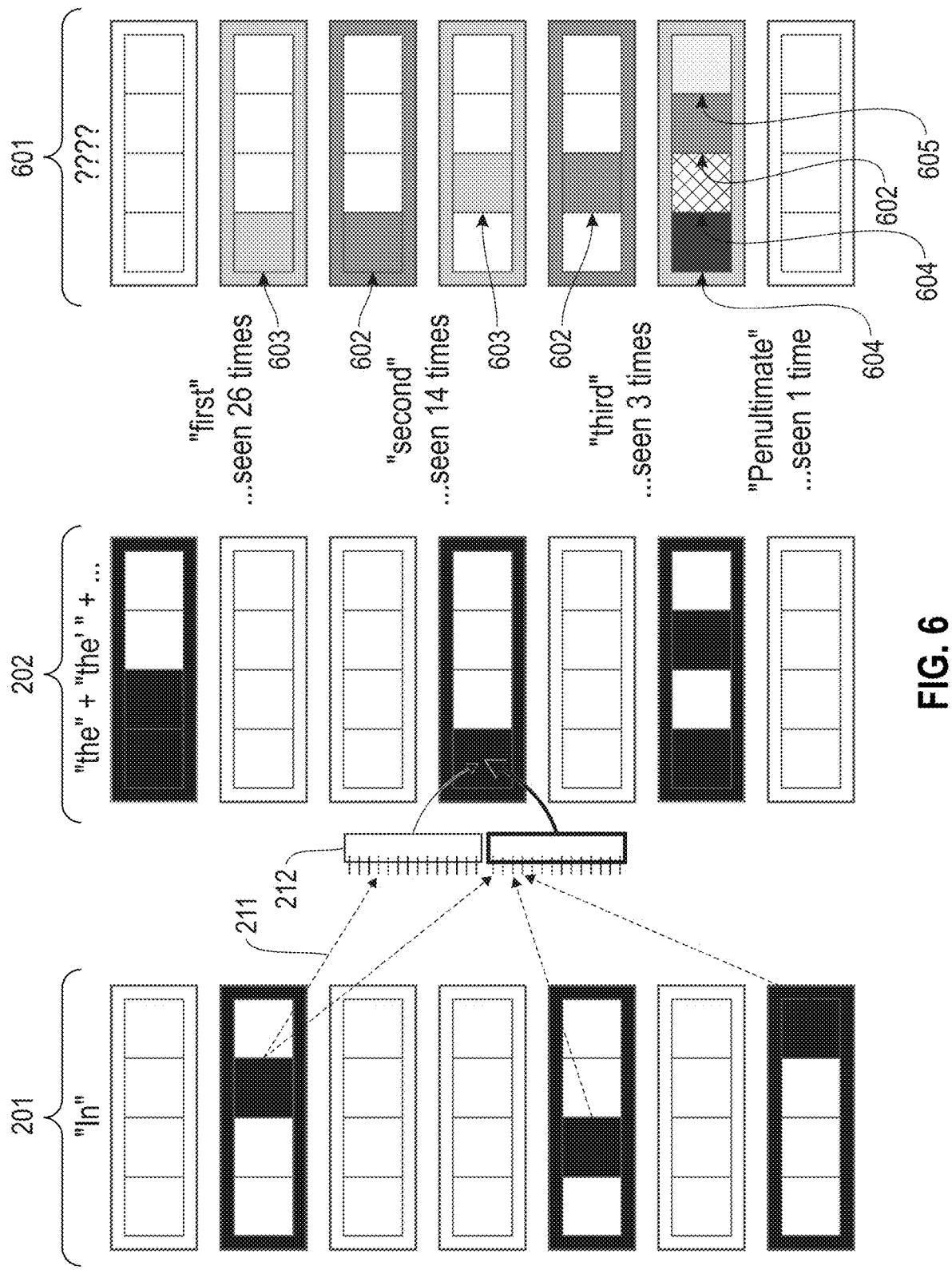
FIG. 6 depicts composite columns within a temporal memory according to embodiments of the present disclosure.

Referring to FIG. 6, a composite of the exemplary phrases of FIGS. 3-4 are illustrated. In this case, column SDR 202, corresponding to the is state, includes the cell SDRs of each occurrence (SDR union), in this case given as "the" and "the'". Column SDR 601, corresponding to the will-be state, includes all possible next SDRs (SDR union) together with observed-frequency-of-occurrence, thereby enabling prediction of all next values. In this example, possible completions of the sample phrase, "first," "second," "third," or "penultimate" are depicted by sets of activated cells 602, 603, 604, 605.

As set forth below, a single-shot temporal memory according to embodiments of the present disclosure provides differentiation of the same SDR by both outgoing and incoming context. Single-shot learning allows sequences to be memorized the first time they are shown. This allows prioritized assignment of finite resources, such that with limited resources, the most infrequent permutations are preferentially forgotten.

Referring to FIGS. 7-11, a learning process according to embodiments of the present disclosure is illustrated. Column SDRs 701, 702, 703 correspond to sequential time steps as described above.

Figure 7:
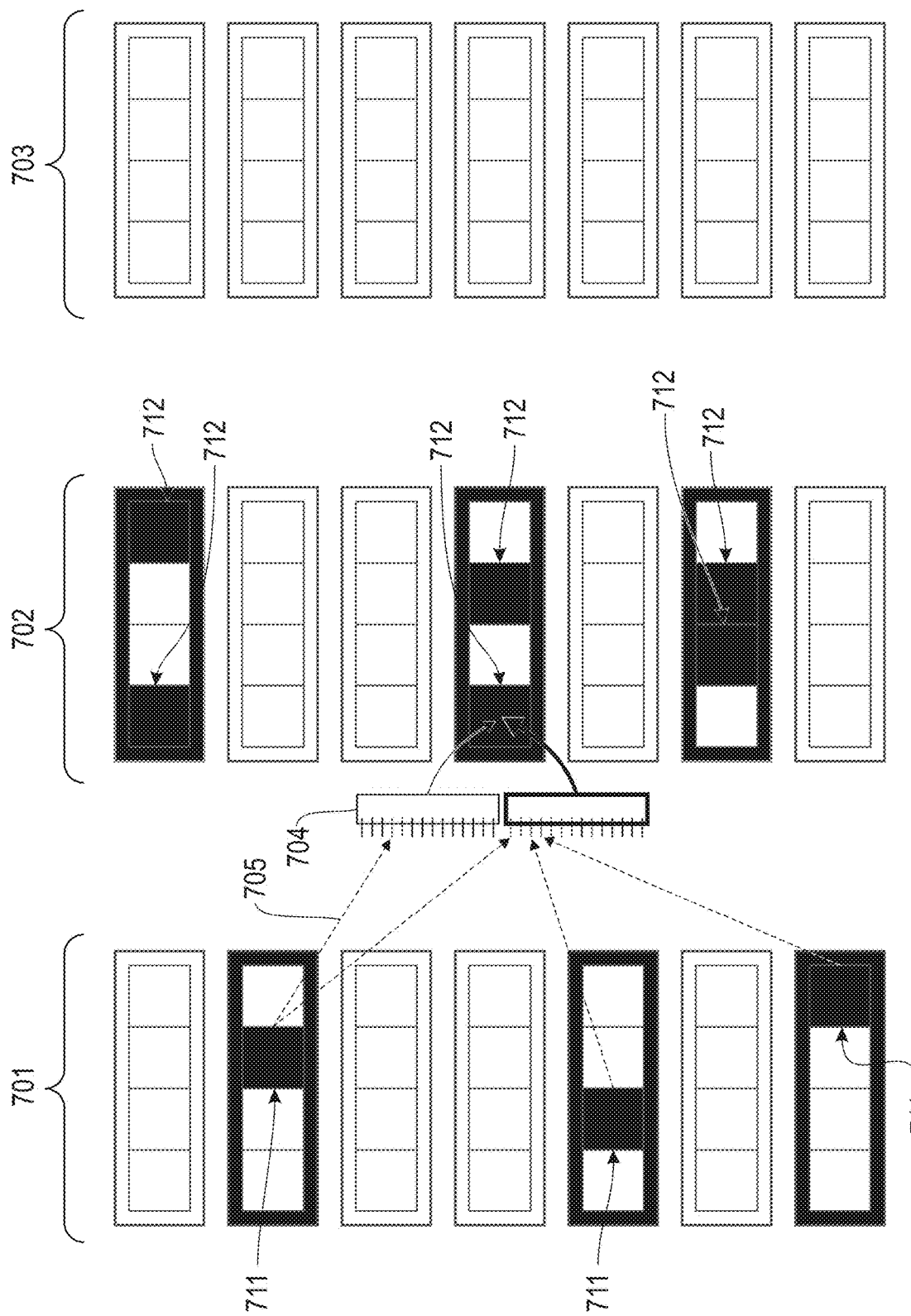
FIGS. 7-11 depicts columns within a temporal memory, illustrating a learning process according to embodiments of the present disclosure.

Referring to FIG. 7, initially information is posted into the learning queue from the was cell SDR 701. Given the current bottom-up inputs 711, all relevant cells 712 within the is column SDR 702 are activated. In restrictive-mode, cells in the is cell SDR 702 are activated if and only if there exists one or more segment (e.g., 704) with a threshold number of synaptic connections (e.g., 705) back to the active cells 711 in the was cell SDR 701. In permissive-mode, cells in the is cell SDR 702 are activated if there exists one or more segment (e.g., 704) with a threshold number of synaptic connections (e.g., 705) back to any cell within the active was column SDR 701.

Figure 8:
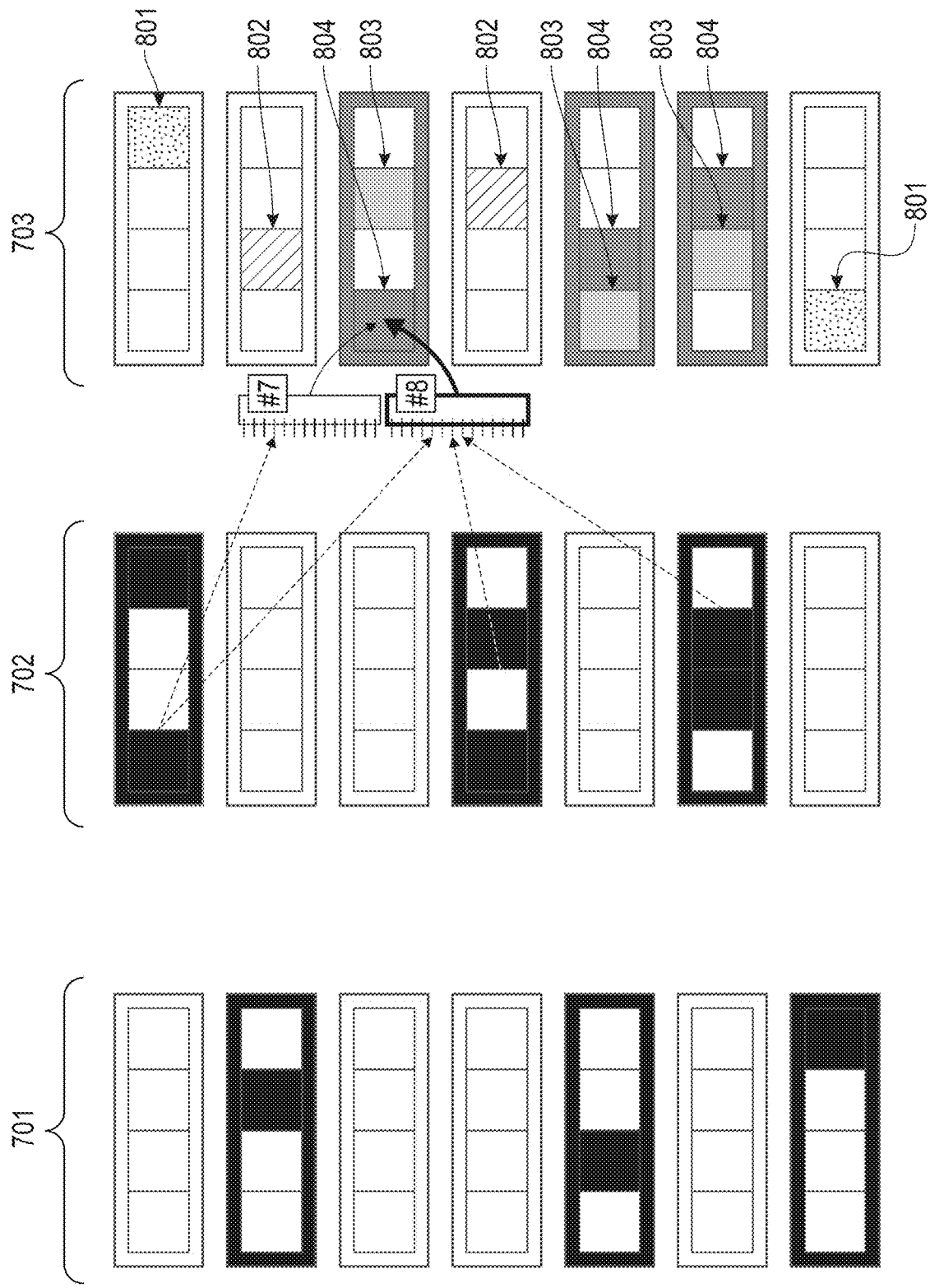

Referring to FIG. 8, given the saturated is cell SDR 702, all cells of any possible (and not yet known) will-be column-SDR are passed through, marking all predicted segments. In this example, cells are shown in column SDR 703 in groups 801 . . . 804, corresponding to each possible prediction. For each instance that is observed, the will-be cell SDR 703 it is passed through and all associated columns & cells are tagged for both this will-be SDR and the is SDR 702 (representing 1 disambiguated prediction, here shown as groups 801 . . . 804). In example, tags are shown for exemplary instance numbers #7 and #8. The largest associated permanence values represent the number of times each instance is observed.

Figure 9:
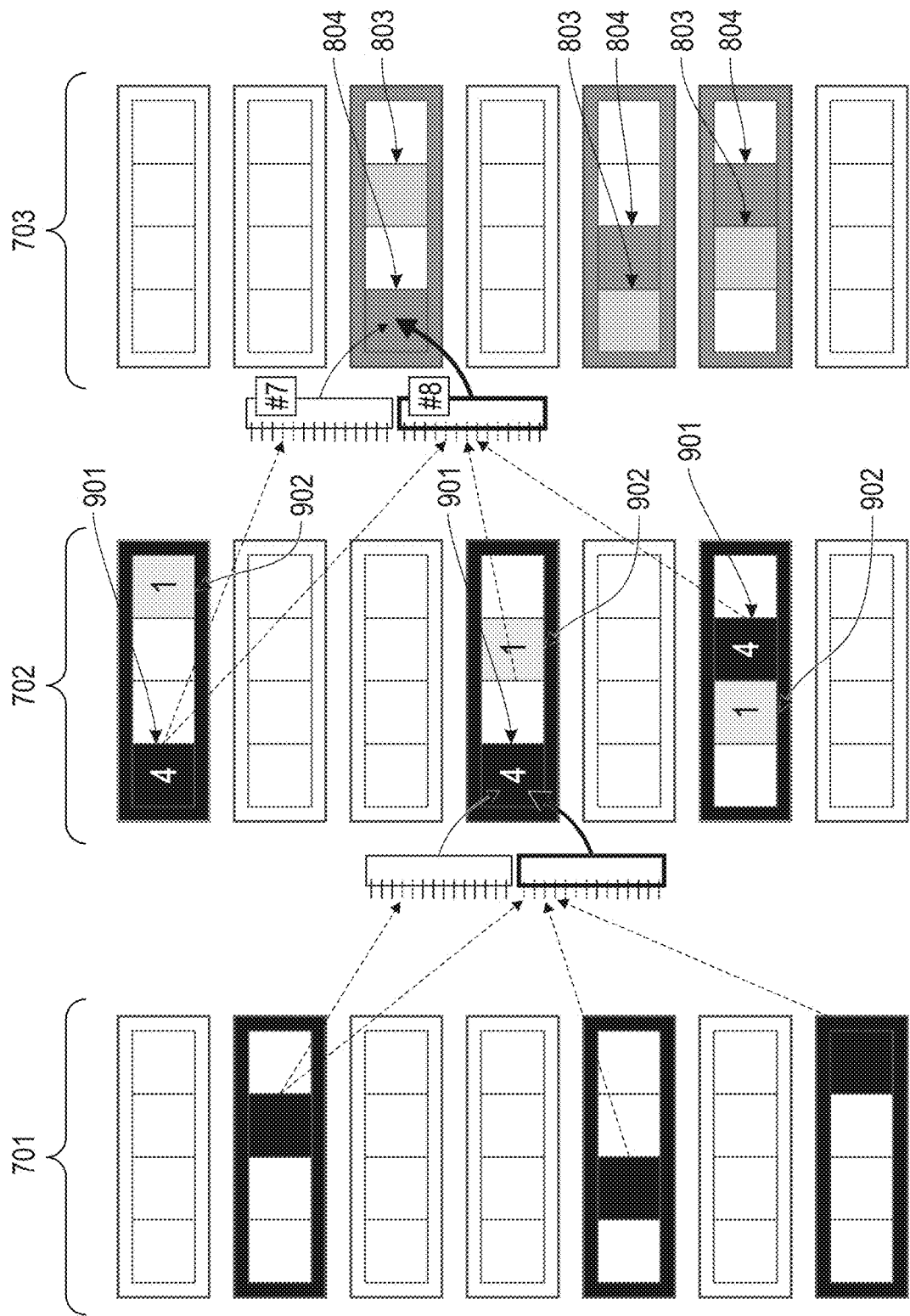

Referring to FIG. 9, given this saturated is cell-SDR, all cells of the now known will-be column SDR 703 are passed through, tabulating the number of times that cells in the saturated is cell-SDR 702 will successfully be able to predict a will-be segment. In this example, cells 901 have cardinality of 4 and cells 902 have cardinality of 1. At the same time, the instance numbers are noted. If a sufficiently large number of will-be columns is predicted, then the responsible instance number is identified. In this example, only cells 803, 804 corresponding to those two instances meet the threshold. Adopting the example from above, these cells may be associated with the instance numbers corresponding to "the first" and "the second."

Figure 10:
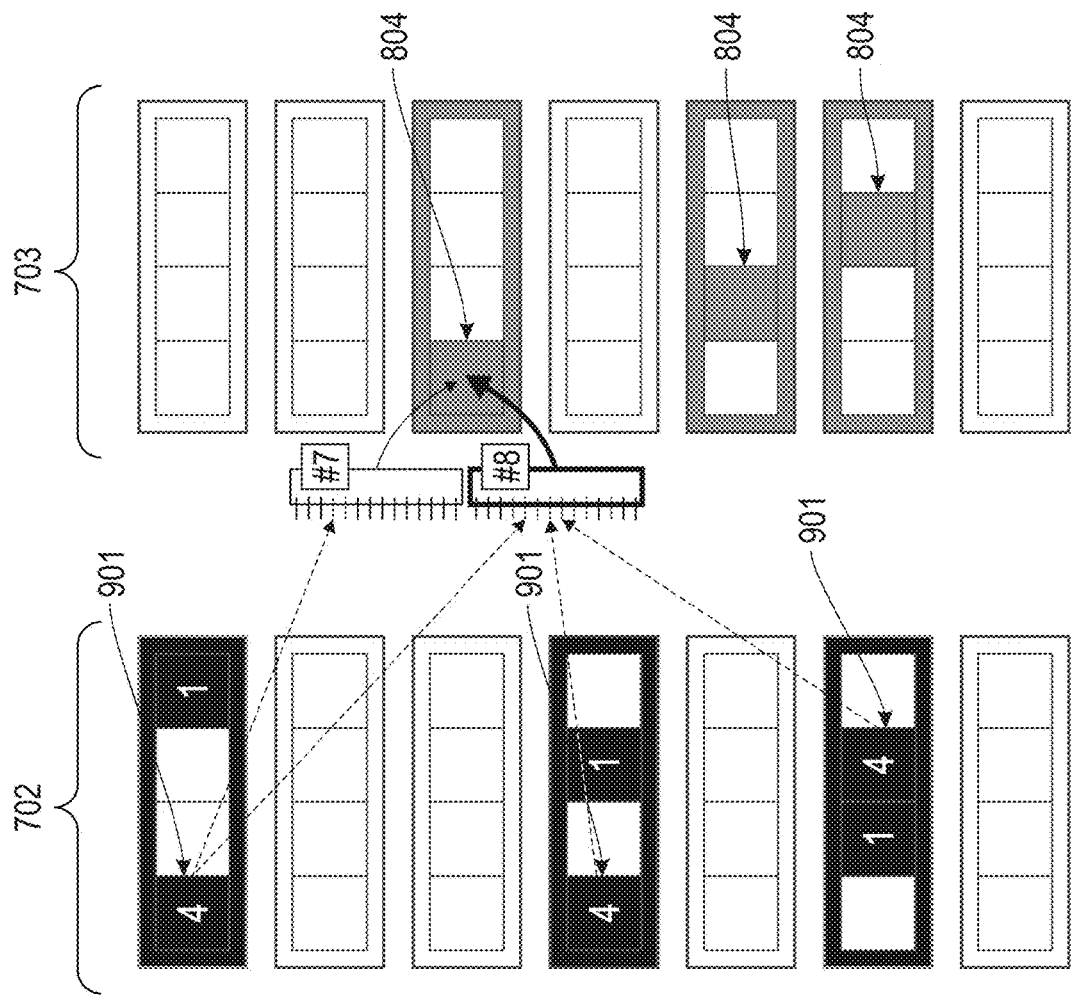
Figure 10:
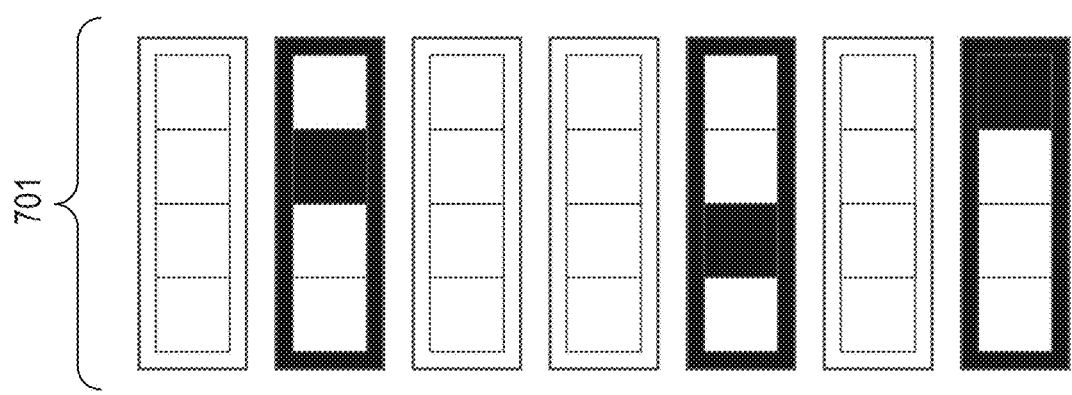

Referring to FIG. 10, if will-be is predicted, all columns of the is column SDR 702 are traversed, and only the most-responsible cell of each column of the is column SDR is activated (in this example, cells 901). If will-be is not predicted, all columns of the is column SDR 702 are traversed, and a cell is activated to form a new instance by going through all columns of the is column SDR. In some embodiments, a new cell is chosen randomly, while in some an already active cell is kept. Unlike in convention learning methods, there is no penalty imposed for failed predictions. Instead, synapses are added or supplemented after looking ahead to the will-be column SDRs.

Figure 11:
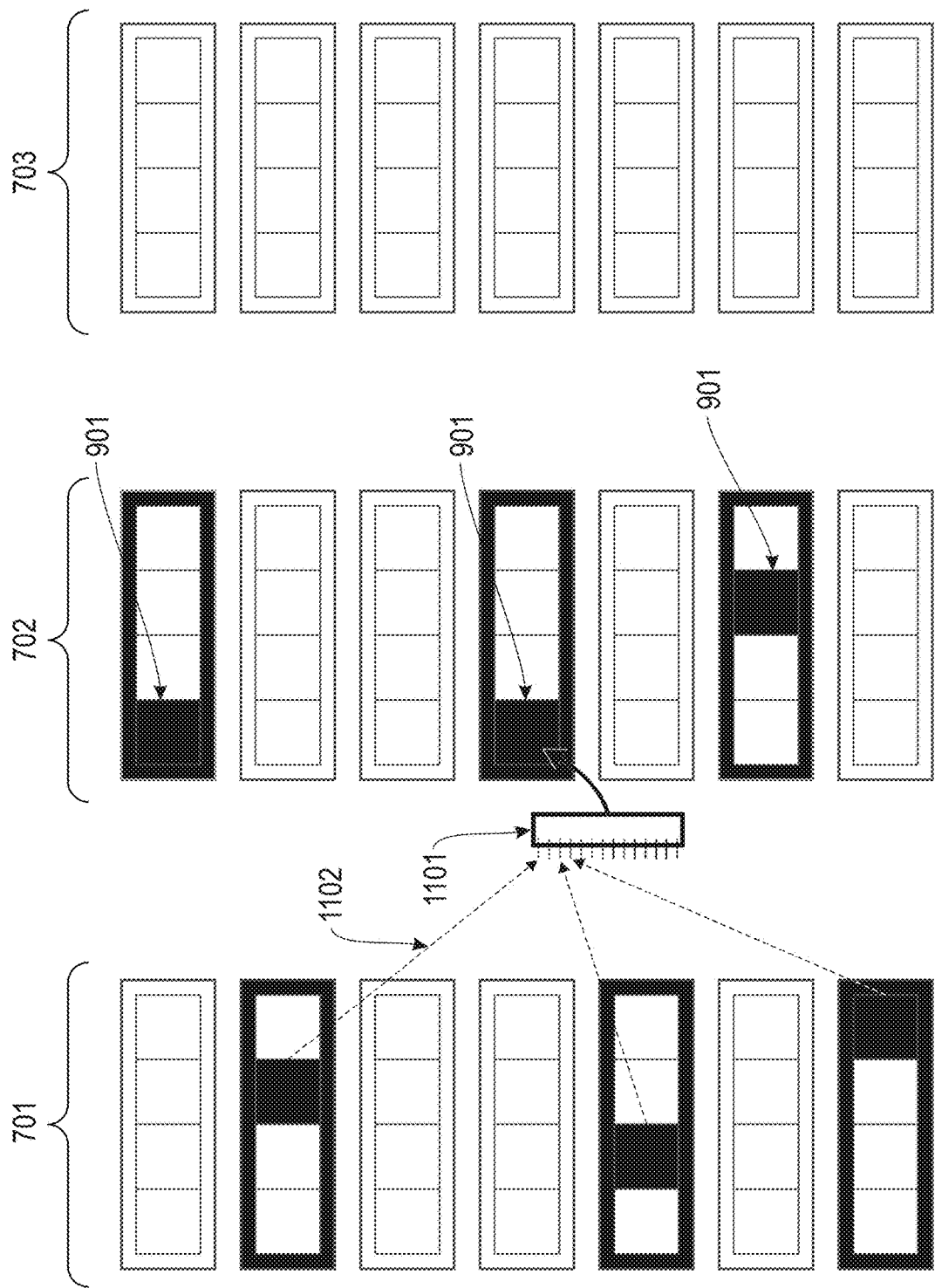

Referring to FIG. 11, if the is cell-SDR (in SDR 702) represents a new instance or if the previous was to is (701 to 702) connection failed to be predicted or recognized, all cells of the is cell-SDR (in SDR 702) are passed through. At this point, SDR 702 is no longer saturated, having just one active cell 901 per column. A new segment 1101 is added, full of synaptic connections 1102 back to the was cell-SDR 701, using the information posted into the learning queue.

Figure 12:
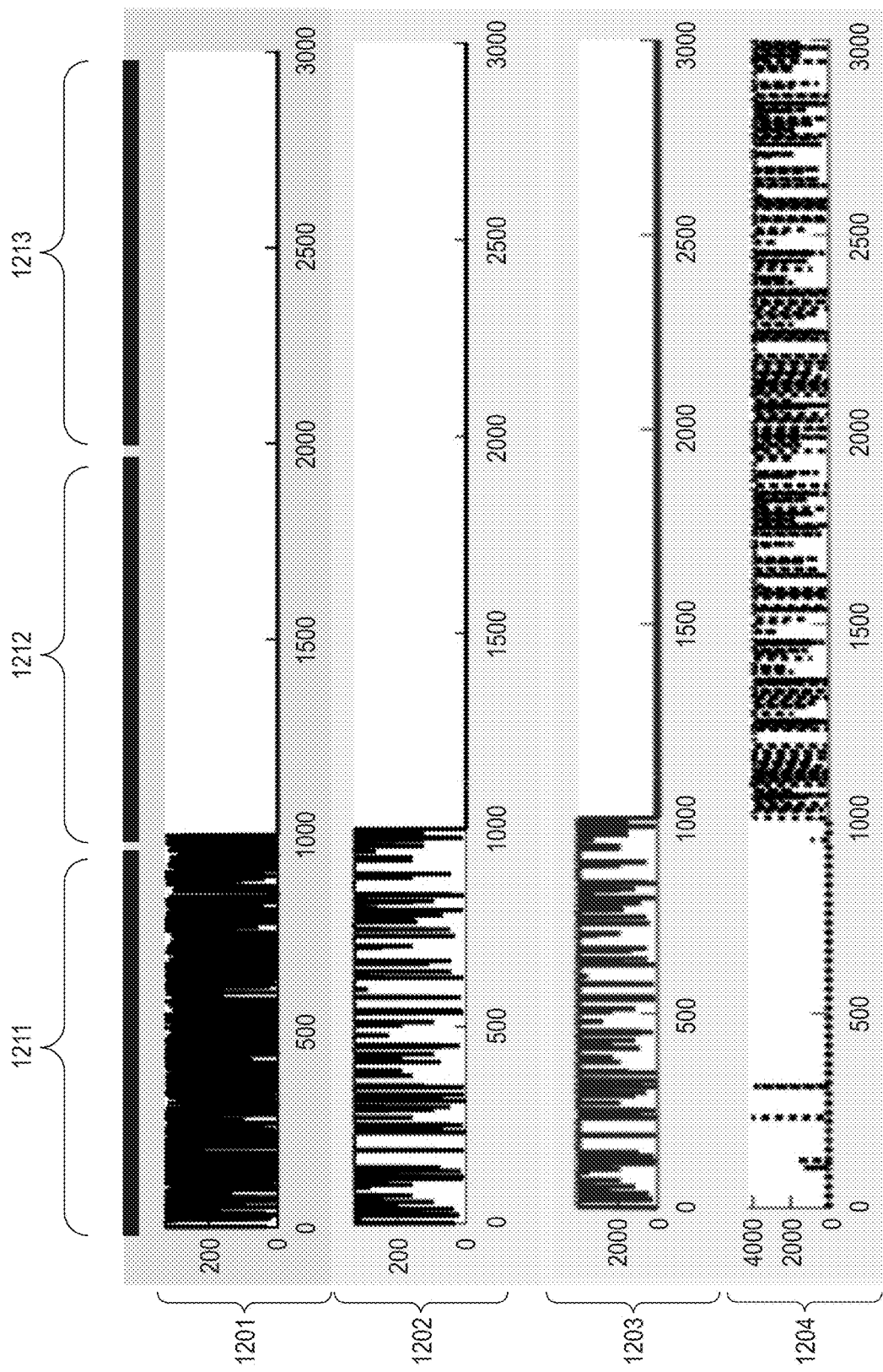
FIGS. 12-13 illustrate results after training single shot hierarchical temporal memory according to embodiments of the present disclosure.

Referring to FIG. 12, results are illustrated after training single shot hierarchical temporal memory according to the present disclosure. The horizontal scale corresponds to the number of words presented. A sequence of length 3000, comprising the same 1000 Sparse Distributed Representations repeated three times is presented. Each SDR encodes one English word. Once the 1000-word sequence has been observed once, the system can fully predict the sequence without error and does no subsequent learning, only incrementing permanences as appropriate to record the multiple observations.

Graph 1201 illustrates the unpredicted columns during the presentation of 1000 words. During initial interval 1211, most columns are unpredicted. In contrast, presentation of the same 1000 words in intervals 1212 and 1213 result in no unpredicted columns. Graph 1202 illustrates the new segments during the presentation of 1000 words. During initial interval 1211, most many segments are new. In contrast, presentation of the same 1000 words in intervals 1212 and 1213 result in no new segments. Graph 1203 illustrates the synapses pulled from the learning queue during the presentation of 1000 words. During initial interval 1211, many synapses are pulled. In contrast, presentation of the same 1000 words in intervals 1212 and 1213 result in no synapses pulled. Graph 1204 illustrates the permanence increments during the presentation of 1000 words. During initial interval 1211, few permanences are incremented. In contrast, presentation of the same 1000 words in intervals 1212 and 1213 results in many permanence increments.

Figure 13:
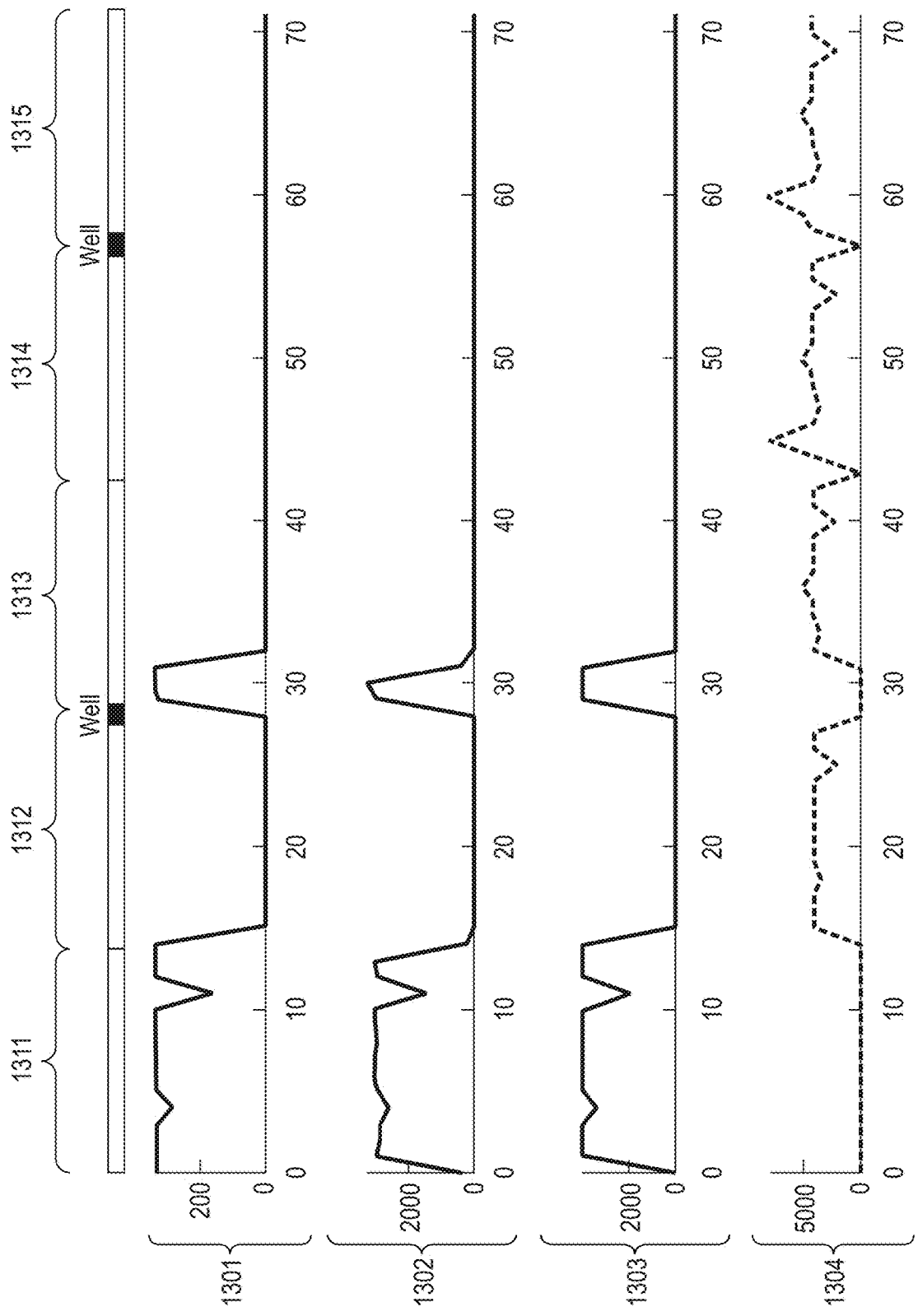

Referring to FIG. 13, results are illustrated after training single shot hierarchical temporal memory according to the present disclosure. The horizontal scale corresponds to the number of words presented. Five variations on a 14 word sentence are presented. Once the sentence has been observed once, the system can accurately predict the sequence notwithstanding its variations.

Graph 1301 illustrates the unpredicted columns during the presentation of the 14 word sentence. During initial interval 1311, most columns are unpredicted. In contrast, presentation of variations on the 14 word sentence in intervals 1312 . . . 1315 result in few unpredicted columns. Graph 1302 illustrates the new segments during the 14 word sentence. During initial interval 1311, most segments are new. In contrast, presentation of variations on the 14 word sentence in intervals 1312 . . . 1315 result in few new segments. Graph 1303 illustrates the synapses pulled from the learning queue during the presentation of the 14 word sentence. During initial interval 1311, many synapses are pulled. In contrast, presentation of variations on the 14 word sentence in intervals 1312 . . . 1315 result in few synapses pulled. Graph 1304 illustrates the permanence increments during the presentation of the 14 word sentence. During initial interval 1311, no permanences are incremented. In contrast, presentation of variations on the 14 word sentence in intervals 1312 . . . 1315 results in many permanence increments.

Figure 14:
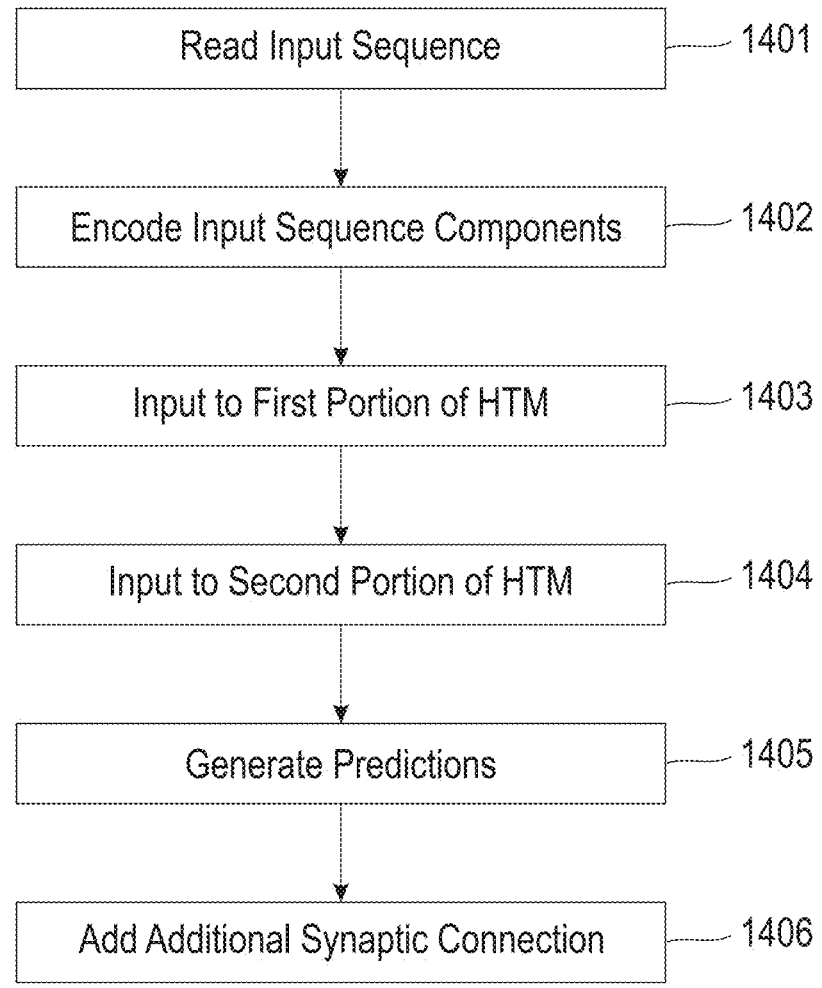
FIG. 14 illustrates an exemplary method according to embodiments of the present disclosure.

Referring to FIG. 14, an exemplary method according to embodiments of the present disclosure is illustrated. At 1401, an input sequence is read. In some embodiments, the sequence comprises first, second, and third time-ordered components. At 1402, each component of the input sequence is encoded in a sparse distributed representation. In some embodiments, each of the first, second, and third time-ordered components is encoded in a sparse distributed representation. At 1403, the sparse distributed representation of the first time-ordered component of the input sequence is inputted into a first portion of a hierarchical temporal memory (HTM). At 1404, the sparse distributed representation of the second time-ordered component of the input sequence is inputted into a second portion of the hierarchical temporal memory. In some embodiments, the second portion is connected to the first portion by a first plurality of synapses. At 1405, a plurality of predictions as to the third time-ordered component is generated within a third portion of the hierarchical temporal memory. In some embodiments, the third portion is connected to the second portion by a second plurality of synapses. At 1406, based on the plurality of predictions, additional synaptic connections are added between the first portion and the second portion.

It will be appreciated that each portion of the hierarchical temporal memory referred to above may share a common region of the hierarchical temporal memory. In particular, in various embodiments, the first, second and third portions may correspond to SDRs within the temporal memory. Thus, in some embodiments, the various portions are intermingled within the same region of the temporal memory, and the first and second time-ordered components are input at different times. The input of the first and second time-ordered components may or may not share cells and columns within a region, depending on the sparse distributed representation. Accordingly, it will be appreciated that the multiple SDR examples discussed above may represent the state of the same region of a hierarchical temporal memory at different times.

Figure 15:
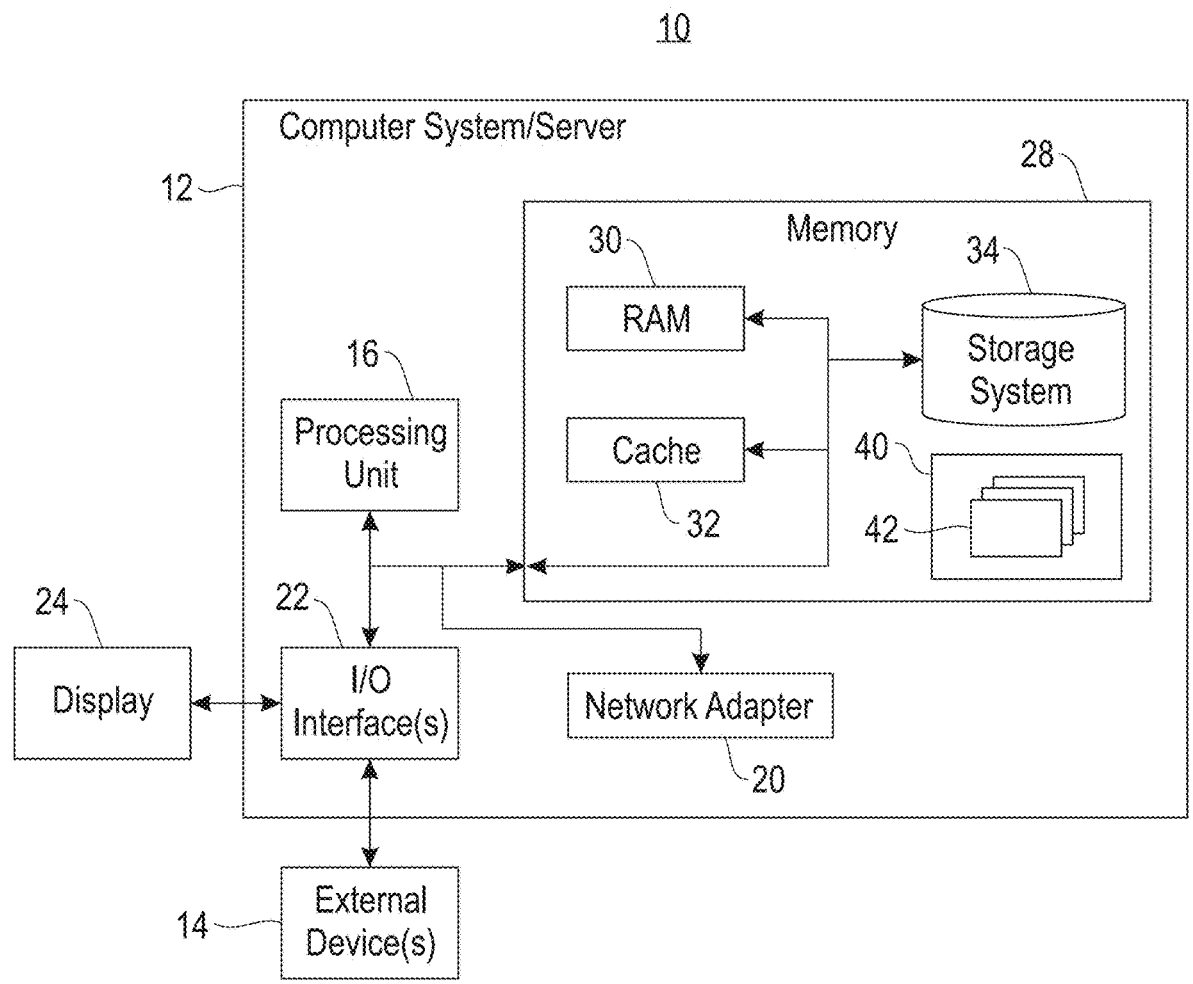
FIG. 15 depicts a computing node according to an embodiment of the present invention.

Referring now to FIG. 15, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    reading an input sequence, the sequence comprising first and second time-ordered components, the second time-ordered component following the first time-ordered component within the sequence;
    encoding each of the first and second time-ordered components in a sparse distributed representation;
    inputting the sparse distributed representation of the first time-ordered component into a first portion of a hierarchical temporal memory, the first portion corresponding to a first time step;
    inputting the sparse distributed representation of the second time-ordered component into a second portion of the hierarchical temporal memory, the second portion being connected to the first portion by a first plurality of synapses, the second portion corresponding to a second time step following the first time step;
    generating a plurality of predictions of a third time-ordered component within a third portion of the hierarchical temporal memory based on a state of the second portion, the third portion corresponding to a third time step following the second time step, the third time-ordered component following the second time-ordered component within the sequence, the third portion being connected to the second portion by a second plurality of synapses; and
    based on the plurality of predictions, adding additional synaptic connections between the first portion and the second portion.

2. The method of claim 1, wherein each of the first, second, and third portions comprises a plurality of columns, each of the columns comprising a plurality of cells.

3. The method of claim 1, comprising:
    disambiguating between each of the plurality of predictions.

4. The method of claim 1, wherein generating the plurality of predictions comprises:
   activating a plurality of cells in the third portion based on a plurality of cells active in the second portion.

5. The method of claim 2, wherein the plurality of cells in the first portion is connected to one or more aggregating segments, each of the one or more aggregating segments being connected to one of the plurality of cells in the second portion.

6. The method of claim 2, wherein the plurality of cells in the second portion is connected to one or more aggregating segments, each of the one or more aggregating segments being connected to one of the plurality of cells in the third portion.

7. The method of claim 4, wherein the plurality of cells active in the first portion encode the sparse distributed representation of the first time-ordered component.

8. The method of claim 4, wherein the plurality of cells active in the second portion encode a plurality of instances of the second time-ordered component.

9. The method of claim 4, wherein the plurality of cells active in the third portion encode the plurality of predictions.

10. The method of claim 9, wherein each of the plurality of cells active in the third portion comprises an instance identifier.

11. The method of claim 1, wherein the first, second, and third portions of the hierarchical temporal memory are all in the same region of the hierarchical temporal memory.

12. A system comprising a non-transitory computer-readable medium with instructions therein, implementing a temporal memory, wherein:
   the temporal memory comprises first, second, and third portions, the first portion corresponding to a first time step, the second portion corresponding to a second time step following the first time step, the third portion corresponding to a third time step following the second time step;
   each portion comprises a plurality of columns;
   each column comprises a plurality of cells;
   the second portion is connected to the first portion by a first plurality of synapses;
   the third portion is connected to the second portion by a first plurality of synapses;
   a plurality of cells is active in the first portion, encoding a sparse distributed representation of a first time-ordered component; and
   a plurality of cells is active in the second portion, encoding a sparse distributed representation of a plurality of instances of a second time-ordered component, the second time-ordered component following the first time-ordered component within a sequence, the temporal memory being adapted to:
      generate a plurality of predictions of a third time-ordered component within the third portion based on a state of the second portion, the third time-ordered component following the second time-ordered component within the sequence, and
      based on the plurality of predictions, add additional synaptic connections between the first portion and the second portion.

13. The system of claim 12, wherein each of the first, second, and third portions comprise a plurality of columns, each column comprising a plurality of cells.

14. The system of claim 12, the temporal memory being adapted to:
   disambiguate between each of the plurality of predictions.

15. The system of claim 12, wherein generating the plurality of predictions comprises:
   activating a plurality of cells in the third portion based on a plurality of cells active in the second portion.

16. The system of claim 13, wherein the plurality of cells in the first portion is connected to one or more aggregating segments, each of the one or more aggregating segments being connected to one of the plurality of cells in the second portion.

17. The system of claim 13, wherein the plurality of cells in the second portion is connected to one or more aggregating segments, each of the one or more aggregating segments being connected to one of the plurality of cells in the third portion.

18. The system of claim 15, wherein the plurality of cells active in the first portion encode the sparse distributed representation of the first time-ordered component.

19. The system of claim 15, wherein the plurality of cells active in the second portion encode a plurality of instances of the second time-ordered component.

20. The system of claim 15, wherein the plurality of cells active in the third portion encode the plurality of predictions.

21. The system of claim 20, wherein each of the plurality of cells active in the third portion comprise an instance identifier.

22. The system of claim 12, wherein the first, second, and third portions of the hierarchical temporal memory are in the same region of the hierarchical temporal memory.

23. A computer program product for operating a temporal memory, the computer program product comprising a computer readable storage medium having program instructions embodied therewith, the program instructions executable by a processor to cause the processor to perform a method comprising:
   reading an input sequence, the sequence comprising first and second time-ordered components, the second time-ordered component following the first time-ordered component within the sequence;
   encoding each of the first and second time-ordered components in a sparse distributed representation;
   inputting the sparse distributed representation of the first time-ordered component into a first portion of a hierarchical temporal memory, the first portion corresponding to a first time step;
   inputting the sparse distributed representation of the second time-ordered component into a second portion of the hierarchical temporal memory, the second portion being connected to the first portion by a first plurality of synapses, the second portion corresponding to a second time step following the second first time step;
   generating a plurality of predictions of a third time-ordered component within a third portion of the hierarchical temporal memory based on a state of the second portion, the third portion corresponding to a third time step following the second time step, the third time-ordered component following the second time-ordered component within the sequence, the third portion being connected to the second portion by a second plurality of synapses; and
   based on the plurality of predictions, adding additional synaptic connections between the first portion and the second portion.

24. The computer program of claim 23, wherein the first, second, and third portions of the hierarchical temporal memory are in the same region of the hierarchical temporal memory.

* * * * *